United States Patent
Ward

(10) Patent No.: US 8,333,560 B1
(45) Date of Patent: Dec. 18, 2012

(54) ANTI-SUDDEN INFANT DEATH SYNDROME BABY FAN

(76) Inventor: James Ward, Point Pleasant, NJ (US)

(*) Notice: Subject to any disclaimer, the term of this patent is extended or adjusted under 35 U.S.C. 154(b) by 653 days.

(21) Appl. No.: 12/482,248

(22) Filed: Jun. 10, 2009

(51) Int. Cl.
    *F04D 33/00* (2006.01)

(52) U.S. Cl. .................. 415/213.1; 415/214.1; 416/63; 416/100; 416/240; 416/241 R; 416/244 R; 417/42; 417/326

(58) Field of Classification Search .......... 415/213.1, 415/214.1; 416/63, 100, 240, 241 R, 244 R; 417/42, 326
    See application file for complete search history.

(56) References Cited

U.S. PATENT DOCUMENTS

| | | | |
|---|---|---|---|
| 3,878,570 A | | 4/1975 | Donnelly |
| 4,799,858 A | * | 1/1989 | Shin-Chin ............... 416/110 |
| 4,867,647 A | * | 9/1989 | Chow ................... 417/423.7 |
| 5,081,722 A | | 1/1992 | Yu |
| 5,317,767 A | | 6/1994 | Hargest et al. |
| 5,547,343 A | * | 8/1996 | Jane et al. ............... 416/246 |
| 5,592,704 A | | 1/1997 | Breese |
| 5,720,594 A | * | 2/1998 | Snow .................... 416/100 |
| 5,725,356 A | * | 3/1998 | Carter ................... 416/240 |
| 5,851,106 A | * | 12/1998 | Steiner et al. ............ 416/63 |
| 5,951,360 A | * | 9/1999 | Fearon et al. ........... 446/227 |
| 6,131,216 A | | 10/2000 | Pine |
| D435,899 S | | 1/2001 | Melwani |
| 2006/0186298 A1 | * | 8/2006 | Thomason et al. ....... 248/316.1 |
| 2010/0125949 A1 | * | 5/2010 | Stebbing .................. 5/423 |

* cited by examiner

*Primary Examiner* — Igor Kershteyn
*Assistant Examiner* — Christopher R Legendre
(74) *Attorney, Agent, or Firm* — Kyle Fletcher

(57) ABSTRACT

The anti-Sudden infant death syndrome baby fan is a portable fan that can attach to a baby crib in order to provide air movement across an infant in order to prevent the likelihood of sudden infant death syndrome. The portable fan comprises a housing, foam blades, rubber mat, knob, ON/OFF switch, and battery compartment. The inclusion of foam blades is a safety design in that foam blades will not inflict any substantive injury to anyone who touches said blades while in motion, i.e. the infant. The portable fan can also be integrated into the design of a crib mobile in order to circulate air from above the crib.

7 Claims, 4 Drawing Sheets

ANTI-SUDDEN INFANT DEATH SYNDROME BAY FAN

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of fans, more specifically, a fan for use with a baby crib that aids in the prevention of sudden infant death syndrome (aka SIDS).

Sudden infant death syndrome (SIDS) is defined as the "sudden death of an infant under one year of age which remains unexplained after a thorough case investigation, including performance of a complete autopsy, examination of the death scene, and review of the clinical history."

Sudden infant death syndrome is the major cause of deaths in infants from 1 month to 1 year of age, with most deaths occurring between 2 and 4 months.

While no one is certain exactly what causes SIDS, a popular theory is that SIDS babies breathe in carbon dioxide they have exhaled, but because they are so small, they cannot move from harm's way. For some unknown reason, carbon dioxide gets trapped in the airway of a SIDS baby.

However, a new study has shown that circulating air in an infant's room dramatically reduces the risk of Sudden Infant Death Syndrome (SIDS) by 72 percent (*Archives of Pediatrics and Adolescent Medicine*, October issue, Dr. De-Kun Li).

B. Discussion of the Prior Art

As a preliminary note, it should be stated that there is an ample amount of prior art that deals with fans generally. As will be discussed immediately below, no prior art discloses a fan made of foam blades that mounts to a crib and is directed to the specific use of preventing sudden infant death syndrome.

The Breese patent (U.S. Pat. No. 5,592,704) discloses a device for blowing small volumes of air, from a pump, blower or fan, across a mattress in a crib to prevent the accumulation of undesirable gases, which may cause SIDS. However, the device involves the use of conduits to transmit air across the sleeping surface of the crib, as opposed to a fan having foam blades that attaches to a side of the crib adjacent the infant's head.

The Donnelly patent (U.S. Pat. No. 3,878,570) discloses an attachment for infant cribs that substantively closes the crib and controls the environment within the enclosure providing heated, humidified, and filtered air to an enclosed crib.

The patent (U.S. Pat. No. 6,131,216) discloses a crib mattress having a plurality of drain channels permitting drainage of heavy gases from an infant crib and consequent displacement of gases with room air. Where the displacement process maybe assisted with the help of a fan.

The patent (U.S. Pat. No. 5,081,722) discloses an adjustable crib with vibrator, moisture sensor, fan, microphone and speaker.

The patent (U.S. Pat. No. 5,317,767) discloses a mattress for use in a crib that prevents sudden infant death syndrome by ensuring an oxygenated breathing space beneath infant. An air permeable material is made into the shape of a pad or a mattress and an air is embedded in the pad or mattress and interconnected with an air pump that circulates fresh air in a breathing space formed beneath an infant by the air permeable mattress.

While the above-described devices fulfill their respective and particular objects and requirements, they do not describe a fan made of foam blades that mounts to a crib and is directed to the specific use of preventing sudden infant death syndrome. In this regard, the anti-Sudden infant death syndrome baby fan departs from the conventional concepts and designs of the prior art, but designed to be used in accordance with recommendations of the "Back to Sleep" campaign.

SUMMARY OF THE INVENTION

The anti-Sudden infant death syndrome baby fan is a portable fan that can attach to a baby crib in order to provide air movement across an infant in order to prevent the likelihood of sudden infant death syndrome. The portable fan comprises a housing, foam blades, rubber mat, knob, ON/OFF switch, and battery compartment. The inclusion of foam blades is a safety design in that foam blades will not inflict any substantive injury to anyone who touches said blades while in motion, i.e. the infant. The portable fan can also be integrated into the design of a crib mobile in order to circulate air from above the crib.

An object of the invention is to provide a fan that attaches to a crib in order to direct moving air across an infant's face in order to minimize the likelihood of sudden infant death syndrome from occurring.

A further object of the invention is to provide a fan made of foam blades in close proximity of an infant in order to insure adequate air circulation while providing fan blades that will not inflict any substantive injury to the infant should said infant touch the foam blades while moving.

A further object of the invention is to provide a fan that attaches to a crib via a rubber pad and adjustable knob.

A further object of the invention is to provide a fan that is integrated into the construction of a crib mobile as an alternative embodiment of the invention.

A further object of the invention is for the fan to swivel towards the center of a crib in order to localize air circulation.

Another object of the invention is to enable the fan to be powered either by a plurality of batteries or by an AC power.

These together with additional objects, features and advantages of the anti-Sudden infant death syndrome baby fan will be readily apparent to those of ordinary skill in the art upon reading the following detailed description of presently preferred, but nonetheless illustrative, embodiments of the anti-Sudden infant death syndrome baby fan when taken in conjunction with the accompanying drawings.

In this respect, before explaining the current embodiments of the anti-Sudden infant death syndrome baby fan in detail, it is to be understood that the anti-Sudden infant death syndrome baby fan is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the anti-Sudden infant death syndrome baby fan.

It is therefore important that the claims be regarded as including such equivalent construction insofar as they do not depart from the spirit and scope of the anti-Sudden infant death syndrome baby fan. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
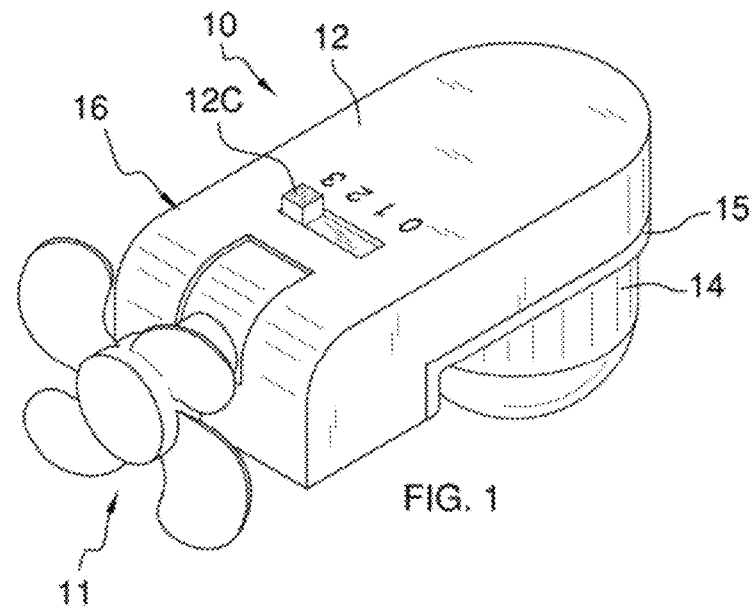
FIG. 1 illustrates an isometric view of the baby fan by itself.
Figure 3:
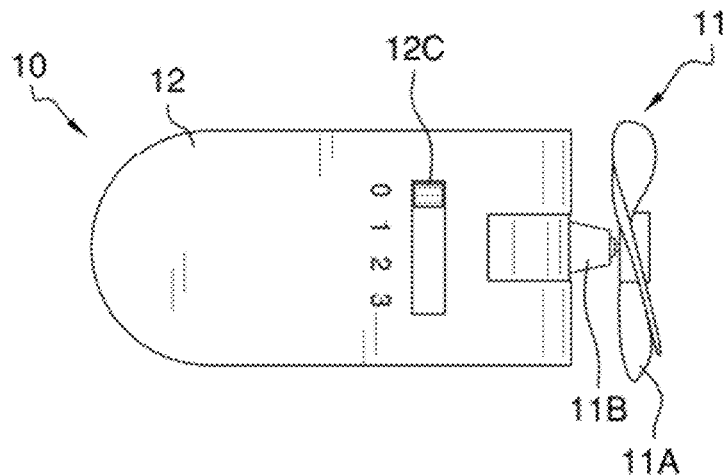
FIG. 3 illustrates a top view of the baby fan and further detailing the on/off control and variable speed.
Figure 2:
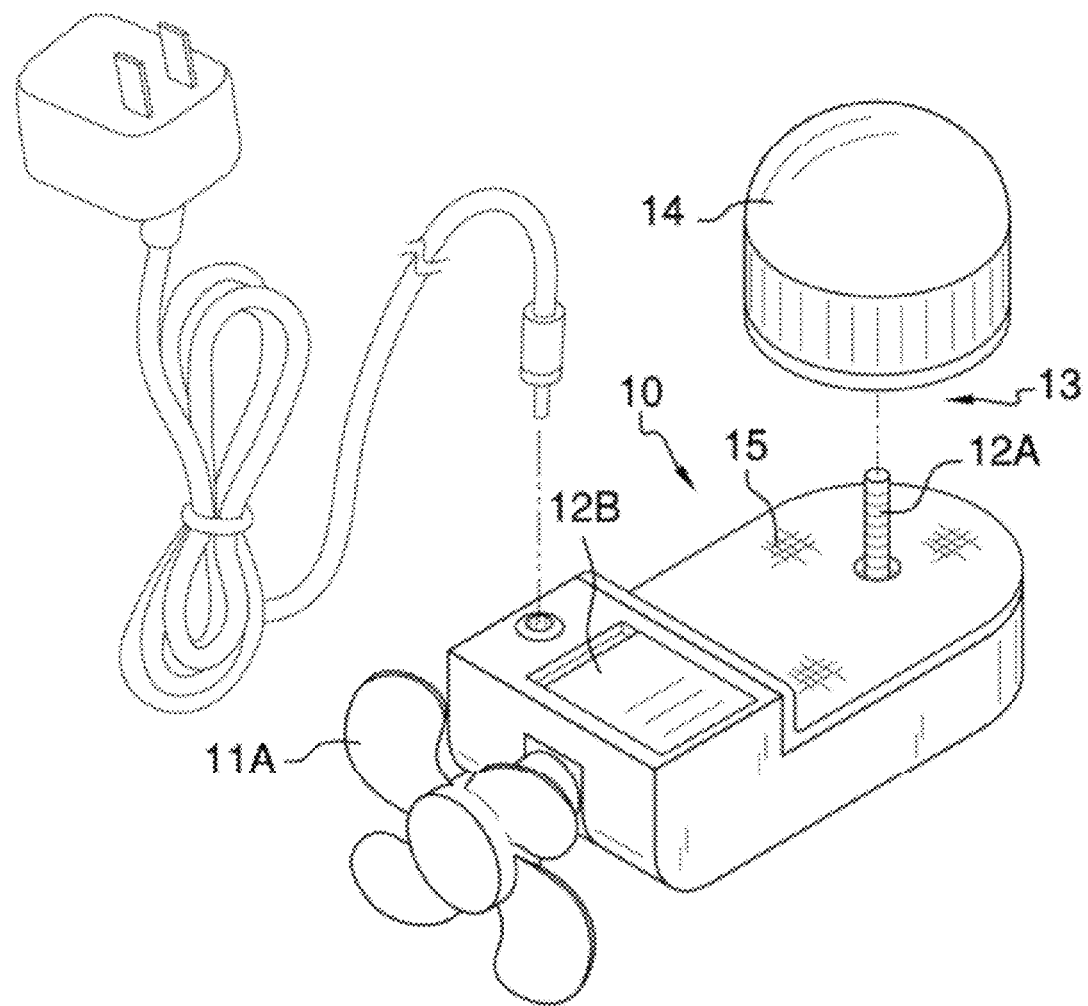
FIG. 2 illustrates an isometric view of a bottom side of the baby fan with the knob detached from the baby fan and detailing the battery compartment, rubber pad that interacts with the knob to form a securing means to a crib, and the optional power cord.
Figure 4:
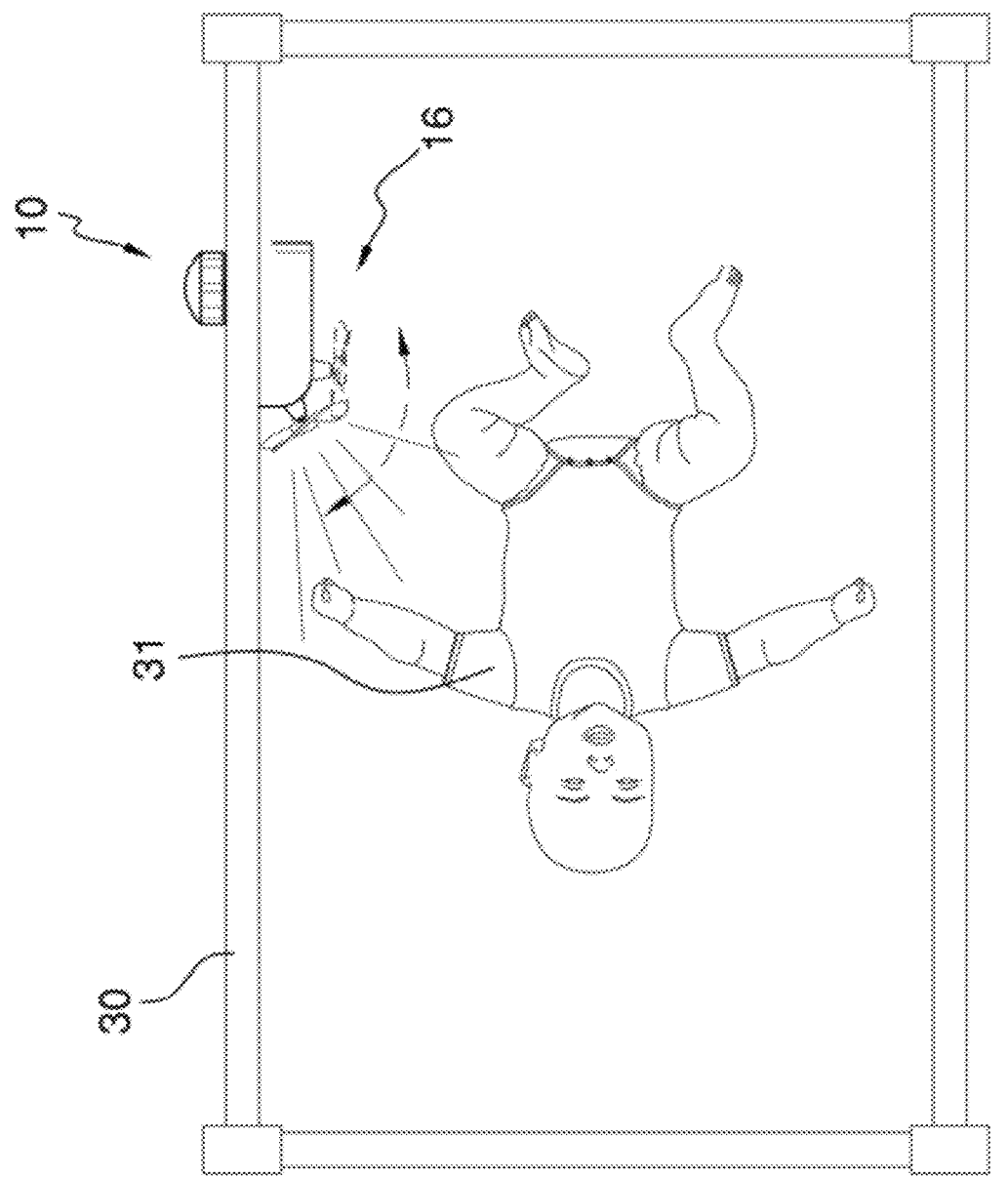
FIG. 4 illustrates a top view of the invention in use with crib and moving air over a baby via an oscillating feature.

Detailed reference will now be made to the preferred embodiment of the invention, examples of which are illustrated in FIGS. 1-4. An anti-Sudden infant death syndrome baby fan 10 (hereinafter invention) includes a fan 11, a housing 12, and crib-attaching means 13.

The crib-attaching means 13 further includes a knob 14 that screws upon a bolt 12A that extends from the housing 12. The knob 14 and the housing 12 clamp onto a crib 30. The crib-attaching means 13 may further include a rubber pad 15 that adorns a portion of an exterior surface of the housing 12 in order to further secure the invention 10 to the crib 30 by increasing the coefficient of friction between the invention 10 and said crib 30.

The housing 12 further includes a battery compartment 12B that contains at least one battery to power the fan 11. However, it shall be noted that the invention 10 may be powered by AC power involving a power cord. The fan 11 consists of a motor 11B that rotates foam fan blades 11A.

The foam fan blades 11A are designed to deform or bend when touched by another object during rotation as a fan. The foam blades 11A prevent injury to an infant 31 when said infant 31 touches the fan 11 during operation.

The invention 10, as illustrated, depicts a swiveling feature 16 that oscillates the foam fan blades 11A back and forth, depending on the orientation of the invention 10 with respect to the crib 30. The swiveling feature 16 ensures greater movement of air across said crib 30 wherein the infant 31 may have moved from beyond the focal point of the invention 10. Alternatively, the invention 10 may come without the swiveling feature 16.

The housing 12 further includes an on/off control 12C to turn the fan 11 on or off, as well as to adjust the speed of the fan 11.

The invention 10 may further include an optional power cord 17 that plugs into the housing 12, and supplies electrical power to the fan 11.

Figure 5:
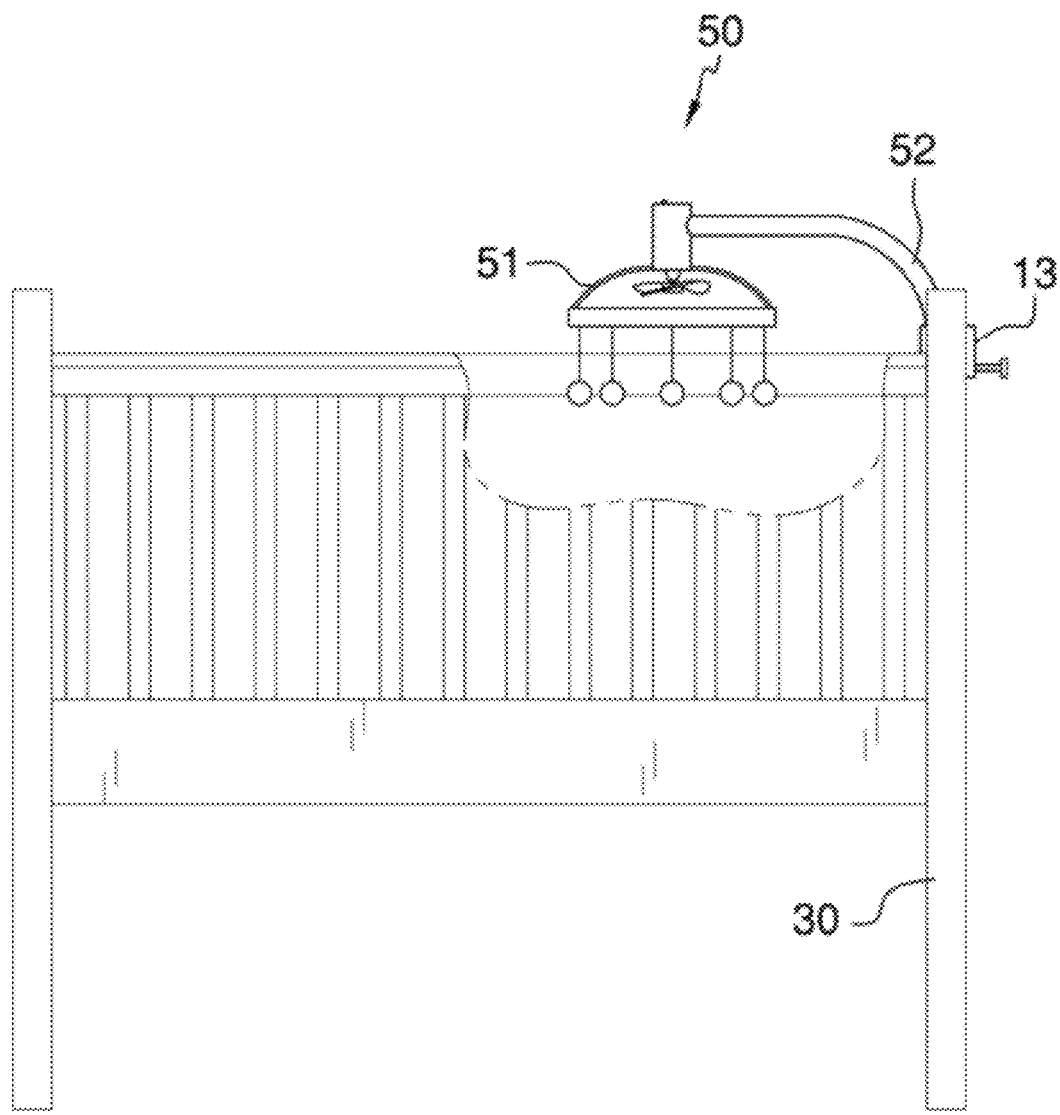
FIG. 5 illustrates an alternative embodiment of the baby fan integrated into the underside of a crib mobile.

Referring to FIG. 5, an alternative embodiment 50 includes the same functions and features of the invention 10 described above with the exception that the alternative embodiment 50 is designed for use with a mobile 51. The crib-attaching means 13 operate with respect to an arm 52 of the mobile 51.

With respect to the above description, it to be realized 1.3 that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An anti-Sudden infant death syndrome baby fan comprising: fan blades that rotate via a motor about a housing, wherein said housing has crib-attaching means that enables the baby fan to attach to a side of a crib for circulating air across an infant in order to minimize the likelihood of sudden infant death syndrome; wherein the crib-attaching means comprises a bolt that extends from said housing and a knob that screws upon said bolt in order to clamp the knob and housing about a crib; wherein an area adjacent the housing and knob is adorned with a rubber pad to increase the gripping capability of the crib-attaching means by increasing the coefficient of friction; wherein the fan blades are made of foam that deforms when touched by another object during operation as a fan in order to prevent injury to an infant in a crib; wherein an on/off control is included on the housing and provides a means of operating the fan; wherein an oscillating feature enables the fan to oscillate back and forth such that said motor translates across said housing; wherein said on/off control has a variable speed control that enables the speed of the fan to be adjusted.

2. The anti-Sudden infant death syndrome baby fan as described in claim 1 wherein a battery compartment is included on the housing and stores a plurality of batteries to power the fan.

3. The anti-Sudden infant death syndrome baby fan as described in claim 1 wherein a power cord provides AC power to power said fan.

4. The anti-Sudden infant death syndrome baby fan as described in claim 1 wherein the housing is made of a material comprising a plastic, wood, or metal.

5. An anti-Sudden infant death syndrome crib mobile having baby fan comprising: fan blades that rotate via a motor about a bottom of a crib mobile for circulating air across an infant in order to minimize the likelihood of sudden infant death syndrome; wherein the fan blades are made of foam that deforms when touched by another object during operation as a fan in order to prevent injury to an infant in a crib; wherein an on/off control is included and provides a means of operating the fan; wherein the mobile has crib-attaching means that extends from a housing of said fan and comprising a bolt that extends from an arm of said mobile and a knob that screws upon said bolt in order to clamp the knob and arm about a crib; wherein said on/off control has a variable speed control that enables the speed of the fan to be adjusted; wherein an oscillating feature enables the fan to oscillate back and forth such that said motor translates across said housing.

6. The anti-Sudden infant death syndrome baby fan as described in claim 5 wherein a battery compartment is included and stores a plurality of batteries to power the fan.

7. The anti-Sudden infant death syndrome baby fan as described in claim 5 wherein a power cord provides AC power to power said fan.

* * * * *